March 21, 1961 J. P. ECKERT, JR 2,976,518

FORCIBLE CAPACITOR DISCHARGE SYSTEMS

Filed April 7, 1955 4 Sheets-Sheet 1

INVENTOR
JOHN PRESPER ECKERT, JR.

BY Charles C. English
AGENT

INVENTOR
JOHN PRESPER ECKERT, JR.
BY Charles C. English
AGENT

March 21, 1961 J. P. ECKERT, JR 2,976,518

FORCIBLE CAPACITOR DISCHARGE SYSTEMS

Filed April 7, 1955 4 Sheets-Sheet 3

INVENTOR
JOHN PRESPER ECKERT, JR

BY Charles C. English

AGENT

March 21, 1961 J. P. ECKERT, JR 2,976,518

FORCIBLE CAPACITOR DISCHARGE SYSTEMS

Filed April 7, 1955 4 Sheets-Sheet 4

INVENTOR
JOHN PRESPER ECKERT, JR.

BY Charles C. English

AGENT 2,976,518

FORCIBLE CAPACITOR DISCHARGE SYSTEMS

John Presper Eckert, Jr., Philadelphia, Pa., assignor to Sperry Rand Corporation, a corporation of Delaware Filed Apr. 7, 1955, Ser. No. 499,904

3 Claims. (Cl. 340—173)

The present invention relates to pulse storage systems of the capacitive type, and is more particularly concerned with amplifier devices utilizing storage capacitors between a pulse generating source and a receiving circuit.

In a preferred form of the present invention, the amplifier or amplifiers employed may comprise pulse type magnetic amplifiers, and it is with this latter form of the invention that the subsequent description is primarily concerned. In many forms of electronic devices, such as coupled amplifiers, storage systems, and bistable devices such as flip-flops and counters, it is often desired to store information pulses for predetermined time intervals. Conventional design in this respect ordinarily requires the use of a device such as a delay line comprising numerous capacitors and inductors, or a magnetic amplifier device, or other appropriate structures preferably giving a rectangular discharge characteristic against time. In the alternative, when capacitive stores are employed, some form of amplitude discrimination is ordinarily desirable, which is sufficiently good to differentiate between the full charge and residual charge on a capacitor employed. When a pulse capacitive store is utilized for the storage of information, information so stored may then be read from the capacitor by partial discharge thereof into a receiving circuit; and inasmuch as such a discharge is exponential in nature, a capacitor, if left to itself, would require an indefinitely long time to discharge completely.

When high speed operation is desired, this exponential discharge characteristic is accompanied by the disadvantages that the output pulse is of a waveform not at all like a desired substantially rectangular output pulse, and further that a residual charge will often remain in a capacitor store so utilized, thereby raising the possibility of spurious or inaccurate operation of an over-all system. In order to obviate the foregoing disadvantages, the present invention relies upon a concept of forcible rapid discharge of capacitor stores thereby to shape output pulses read from such a store, and also to completely remove all residual charge from a capacitor utilized as a store subsequent to a given storage of information therein and prior to the next desired storage of information.

In providing for this operation, the present invention contemplates the provision of control systems such as those employing magnetic amplifiers which utilize a capacitive storage element. In operation, pulses, corresponding for instance to binary digits, are selectively stored in the said capacitor and the capacitor is thereafter partially discharged into a receiving circuit which may in certain forms of the invention comprise a feedback network. After this partial discharge, the capacitor is then completely discharged by having both terminals thereof brought to the same potential whereby no residual of a previous charge may create ambiguity as to whether another charge has been added subsequently.

In preferred embodiments of the present invention, the forcible discharge is effected by pulse means such as a source of discharge pulses coupled to a clamp circuit which is in turn coupled to at least one terminal of the capacitive store; and the discharge means may in turn be regularly operative during predetermined time intervals when pulse amplifier systems, utilizing regularly occurring pulse energization, are employed.

It is accordingly an object of the present invention to provide a novel capacitive storage system.

A further object of the present invention resides in the provision of systems utilizing capacitive stores so arranged that the said store may be forcibly discharged during predetermined time intervals.

Still another object of the present invention resides in the provision of coupled amplifier systems utilizing capacitive storage elements therebetween.

A still further object of the present invention resides in the provision of novel bistable devices such as flip-flops and binary counters utilizing storage devices in combination with means for regularly emptying the store of all residual information.

A still further object of the present invention resides in the provision of novel magnetic amplifier circuits employing forcibly discharged capacitive storage elements.

A further object of the present invention resides in the provision of bistable devices such as flip-flops and binary counters which are more rugged in configuration and less subject to operating failures than has been the case heretofore.

A still further object of the present invention resides in the provision of pulse control systems having better operating characteristics than has been the case heretofore.

Another object of the present invention resides in the provision of capacitive storage elements in combination with novel discharge means for shaping pulses read from the store.

A still further object of the present invention resides in the provision of control systems employing capacitive storage elements in combination with means for periodically bringing both terminals of a capacitive store so employed to the same potential thereby to remove all residual charge present in the capacitor.

In effecting the foregoing objects and advantages, the present invention utilizes amplifier devices, such as pulse type magnetic amplifiers, having a capacitor coupled to the output thereof. A further magnetic amplifier may be coupled to the said capacitor thereby to provide an improved means for coupling pulse type amplifiers in cascade, or the said capacitor may be coupled back to the input of the said amplifier by a feedback network thereby to cause said amplifier to exhibit plural stable states of operation. A course of discharging pulses is also coupled to the system for regularly bringing both terminals of the capacitor to substantially the same potential and the discharge pulses are so timed in respect to input pulses and energization power pulses employed that all residual charge in the capacitor is regularly removed therefrom prior to the further storage of a subsequently occurring output pulse from the amplifier.

The foregoing objects, advantages, construction and operation of the present invention will become more readily apparent from the following description and accompanying drawings, in which.

Figure 1:
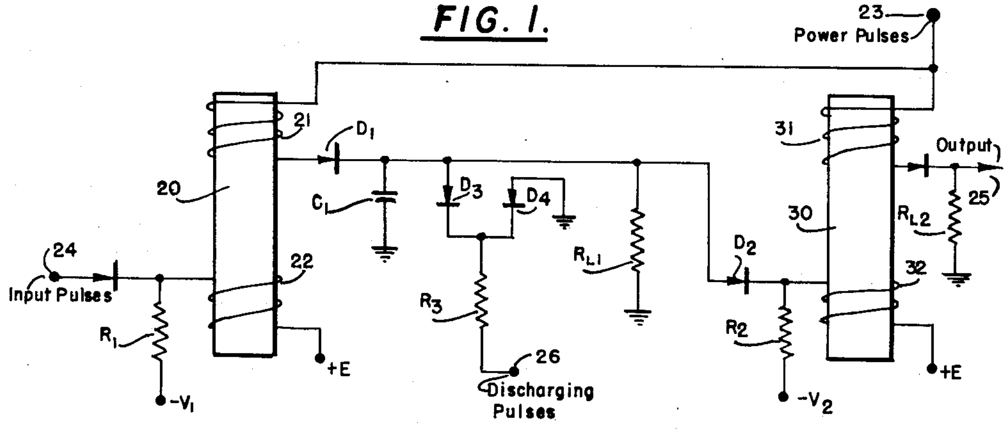
Figure 1 is a schematic diagram of a coupled magnetic amplifier circuit employing a forcibly discharged capacitor store.
Figure 2:
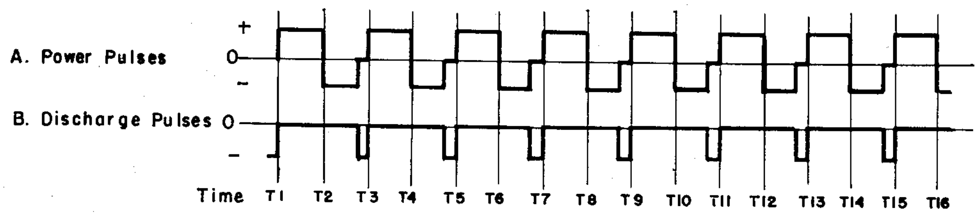
Figure 2 (A and B) are waveform diagrams illustrating pulse configurations which may be employed in the systems of Figures 1, 3, 6, 7 and 11.

Referring now to the circuit of Figure 1 and the waveforms of Figure 2, it will be seen that the concepts of the present invention may be employed in coupled magnetic amplifier devices of the pulse type wherein it is desired to store pulse outputs of a first amplifier stage for a predetermined time interval prior to the coupling of information so stored to the input of a next subsequent amplifier stage. When plural amplifiers are employed, such amplifiers may comprise magnetic cores 20 and 30, for instance, which preferably but not necessarily comprise magnetic materials exhibiting a substantially rectangular hysteresis loop. Such cores may be made of a variety of materials, including Orthonik and 4–79 Molypermalloy; and these materials may in turn be given different heat treatments to effect different desired properties. The cores may, further, take various forms including both open and closed core configurations, but it is to be understood that the present invention is in no way limited to any particular core configuration nor to any precise hysteretic characteristic of the cores utilized.

The cores 20 and 30 may carry power windings 21 and 31 thereon, respectively, coupled to a source of regularly occurring power pulses 23; and these power pulses may in turn assume the waveform configuration shown in Figure 2A, comprising positive and negative-going pulse portions with a zero pulse portion occurring during the transition from a negative-going to a positive-going pulse portion. The cores 20 and 30 may further carry signal or input windings 22 and 32 thereon; and these signals or input windings may in turn be coupled at one of their ends to a source of positive potential +E, and at their other ends, via resistive elements R1 and R2, to sources of negative potential $-V_1$ and $-V_2$ respectively.

Controlling input pulses may be coupled to the first stage of the cascaded amplifiers, shown at a terminal 24. The output of the first stage utilizing core 20 selectively appears via a rectifier D1 whereby it may be stored in a capacitive element C1. Upon discharge, this capacitive element C1 passes a further pulse input via a rectifier D2 to the input of the second amplifier stage, employing the core 30, and the output of this second stage may then be taken at an output point 25 across a load impedance $R_{L2}$. If desired, a further load impedance $R_{L1}$ may be coupled to the system, as shown, for the taking of outputs corresponding to operation of the first amplifier stage.

The capacitive storage element C1 is selectively and forcibly discharged by a source of discharging pulses coupled to a terminal 26 and these discharging pulses may in turn take the configuration shown in Figure 2B, comprising negative-going pulses occurring during the zero portions of the power pulse source (Figure 2A). The discharging pulses are in turn coupled to the system by the rectifiers D3 and D4, and the impedance element R3 connected as shown. In operation, each of the magnetic amplifier stages shown acts as a non-complementing amplifier of the pulse type, and in this respect a non-complementing amplifier is defined as one which will not produce an output pulse unless an input pulse is coupled thereto.

Thus, referring to the arrangement shown in Figure 1 and discussing the first magnetic amplifier stage shown, it will be seen that, during a time interval *t1* to *t2*, for instance (see Figure 2), a positive-going pulse is applied from the source 23 to the power or output winding 21 of this first amplifier stage. If we should assume that the core 20 is initially at its minus remanence operating point, this positive-going power pulse will drive the said core from its said minus remanence operating point to the region of its plus remanence operating point, during the time interval *t1* to *t2*. For this particular state of operation, the winding 21 exhibits a relatively high impedance, whereby the energy of the power pulse applied is substantially entirely utilized to flip the core 20 from its minus to its plus remanence point, without effecting an appreciable output via the rectifier D1. During a next subsequent time interval *t2* to *t3*, the power pulse applied to terminal 23 is negative-going in nature, whereby the rectifier D1 is substantially cut off. During this particular time interval, a reverse current flow will pass from the source +E via the input winding 22 and the resistor R1, to the source of negative potential $-V_1$, and the current flow so effected reverts the core 20 from its plus remanence to its minus remanence operating point, whereby a next positive-going power pulse, occurring for instance during the time interval *t3* to *t4*, will once more find the winding 21 to exhibit a high impedance and no output will be produced. Thus, in the absence of signal inputs at the terminal 24, the power pulses applied to terminal 23 will cause the core 20 (and by the same nature, the core 30) to regularly traverse its hysteresis loop without producing output pulses.

Inasmuch as the reversion of the core or cores occurs during the application of negative-going power pulses at the terminal 23, however, if an input pulse should be coupled to the winding 22 via the terminal 24 (or to the winding 32 via the rectifier D2), in coincidence with a negative-going power pulse portion, such an input pulse will effectively oppose the reverting current flow through the signal winding or windings during this negative-going power pulse portion, whereby the core or cores will remain at its plus remanence operating point and the next subsequent positive-going power pulse applied at the terminal 23 will drive the core or cores into positive saturation. For the latter state of operation, the winding 21 (or winding 31), exhibits a relatively low impedance whereby an appreciable output will be coupled via the rectifier D1 (or to the output point 25, across the load $R_{L2}$).

Inasmuch as the output of the amplifier utilizing core 20 selectively occurs during positive-going power pulse portions and inasmuch as the said power pulses are coupled to each of the amplifiers shown in Figure 1, it is necessary to effect a delay or storage of output pulses from the first amplifier stage prior to application of that output pulse as an input to the next subsequent stage. In the arrangement of Figure 1, this storage is effected by a capacitor C1 coupled to the output of the first amplifier stage, as shown.

Thus, let us assume that an input pulse is coupled to the terminal 24 during a time interval *t6* to *t7*. The said first amplifier stage utilizing core 20 will, in accordance with the preceding discussion, produce a positive-going output pulse via the rectifier D1 during the next subsequent time interval *t7* to *t8*; and this output pulse will appear across the load $R_{L1}$ and will charge the capacitor C1 during this particular time interval. It should be noted that this particular output pulse is effectively prevented from being coupled to the winding 32 via the rectifier D2 during the time interval *t7* to *t8*, inasmuch as the positive-going power pulse applied to winding 31 during this time interval induces a potential in the signal or input winding 32, having a value substantially +2E at the cathode of rectifier D2.

During the time interval *t8* to *t9*, however, when the applied power pulse is negative-going, the capacitor C1 will discharge exponentially and will pass an input pulse via the rectifier D2 to the signal or input winding 32, which effectively opposes the reverting current flow through the said winding 32 during this time interval. In order to shape the pulse so passed from the capacitor C1 to the rectifier D2, and in order to completely remove all residual charge from the capacitor C1 in preparation for a further store of information therein which could possibly occur during the time interval *t9* to *t10*, for instance, a negative-going discharging pulse is coupled to the source 26 in coincidence with the zero of the power pulse occurring between the transition from a negative-going to a positive-going power pulse portion.

Prior to the application of this discharging pulse, the terminal 26 is effectively at ground potential and a current may flow via the rectifier D3 and the resistor R3 to the terminal 26, which current flow maintains the common cathode connection of the rectifiers D3 and D4 at a positive potential. Upon application of the negative-going discharge pulse, for instance immediately prior to the time *t9*, the rectifier D4 connects whereby the common cathode connection of the rectifiers D3 and D4 and the anode of rectifier D3 drop to substantially ground potential. During this application of the negative-going discharge pulse, therefore, the upper terminal of the storage capacitor C1 is brought to substantially the same potential as the lower terminal thereof, namely, to ground potential, whereby the capacitor C1 is rapidly and forcibly discharged subsequent to the partial discharge thereof through the rectifier D2, and prior to the next possible storage of an output pulse from the first amplifier stage. By this arrangement, therefore, the required storage and delay of output pulses from one amplifier stage to a next subsequent stage is effected, and all residual charge in the capacitor is forcibly removed therefrom prior to the next possible storage of information therein.

Figure 3:
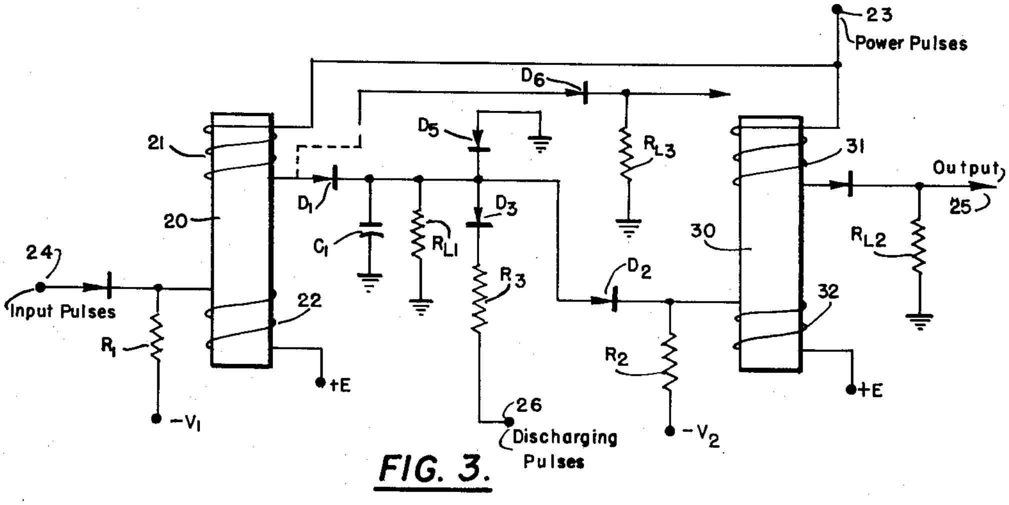
Figure 3 is a schematic diagram of a further coupled magnetic amplifier structure employing capacitive intermediate storage.

A further arrangement comprising coupled magnetic amplifiers, operating in accordance with the foregoing discussion, has been shown in Figure 3; and like components have been designated by like numerals throughout. The power pulse and discharging pulse waveforms for the arrangement of Figure 3 are again the same as those in Figure 2. In accordance with the modification shown in Figure 3, however, the rectifier D4, rather than being coupled between the cathode of rectifier D3 and ground, may be coupled between the anode of the said rectifier D3 and ground, and this further rectifier connection is represented by the rectifier D5, shown in Figure 3.

In operation, once more, when the discharging pulse source applied to terminal 26 is at substantially ground potential, the rectifier D5 is disconnected. Upon application of a negative-going discharge pulse at the terminal 26 during a zero of the applied power pulses, however, the rectifier D5 connects, thereby causing the cathode thereof to be at substantially ground potential whereby once more both terminals of the storage capacitor C1 are brought to the same potential, thereby forcibly discharging the said storage capacitor.

A further possible modification in accordance with the present invention has also been shown in Figure 3, in that in addition to or in place of the load $R_{L1}$, outputs may be taken from the first amplifier stage in parallel with the storage path, for instance across a load $R_{L3}$ via a rectifier D6, and this further possible configuration has been shown in dotted line in Figure 3.

The arrangements thus far described in reference to Figures 1 and 3, each employ discharging pulses occurring during zeros of applied power pulses. This particular pulse configuration, however, is not mandatory and a further arrangement has been shown in Figure 4 (and in the waveforms of Figure 5), wherein the applied discharging pulse may occur at a time when the power pulse is already positive-going and is already driving the load. Thus, referring to Figure 4, it will be seen that two magnetic amplifiers comprising the cores 20 and 30 and their associated windings and impedances, may be employed in the manner already described. The output of the first magnetic amplifier stage utilizing core 20 again selectively appears via a rectifier D1 and across a load $R_{L1}$; and in accordance with the particular arrangement shown, the clamp circuit comprising a rectifier D7 and a resistor R4 coupled to a source of negative potential $-V_3$, as shown, may be coupled to the cathode of the said rectifier D1. The clamp D7–R4 acts as a sneak suppressor, and in this respect it will be noted that when the core 20 is being driven from its minus remanence to its plus remanence point (a mode of operation desirably producing no output), a small output pulse may nevertheless appear via the rectifier D1. This "sneak pulse" is effectively suppressed by so choosing the magnitude of resistor R4 that a current flows via the rectifier D7 and the said resistor R4 to the source of negative potential $-V_3$, which is greater than or equal in magnitude to the sneak pulse current to be suppressed, whereby only outputs substantially larger than the sneak pulse may be passed from the first amplifier stage. It will be understood, of course, that the particular sneak suppressor shown or modifications thereof, may be employed in any of the circuits already described or to be described.

The coupling network between the output of the first amplifier stage and the input of the next subsequent amplifier stage includes a gating arrangement comprising rectifiers D8 and D9, and a resistance R5 coupled from a common anode connection of the said rectifiers D8 and D9 to a source of positive potential $+V_4$. In the absence of a pulse output from the first amplifier stage utilizing core 20, current will flow from source $+V_4$ via resistor R5, rectifier D8, and resistor R4 to source $-V_3$. R4 is preferably so selected that in this case a current also flows in rectifier D7, the cathode of D7 thus being at ground potential. Hence, no current will flow from the source $+V_4$ via the rectifier D9 to the storage capacitor C2. However, if an output pulse should in fact be coupled to the point X from the first amplifier stage, rectifiers D7 and D8 will be disconnected whereby current will flow from the source $+V_4$ via resistor R5 and the rectifier D9, charging the capacitor C2. As was mentioned previously, this charging current flow is again prevented from passing via the rectifier D2 to the input of the second amplifier stage, inasmuch as the cathode of the said rectifier D2 is at a potential greater than +E, due to the application of a positive-going power pulse to the winding 31 from the terminal 23. Upon discharge, however, the capacitor C2 will pass an input current to the second amplifier stage via rectifier D2, and the application of a discharging pulse at the terminal 26 will thereafter once more forcibly and substantially completely discharge the said capacitor by bringing both terminals thereof to substantially the same potential prior to the storage of a next possible pulse.

Figure 4:
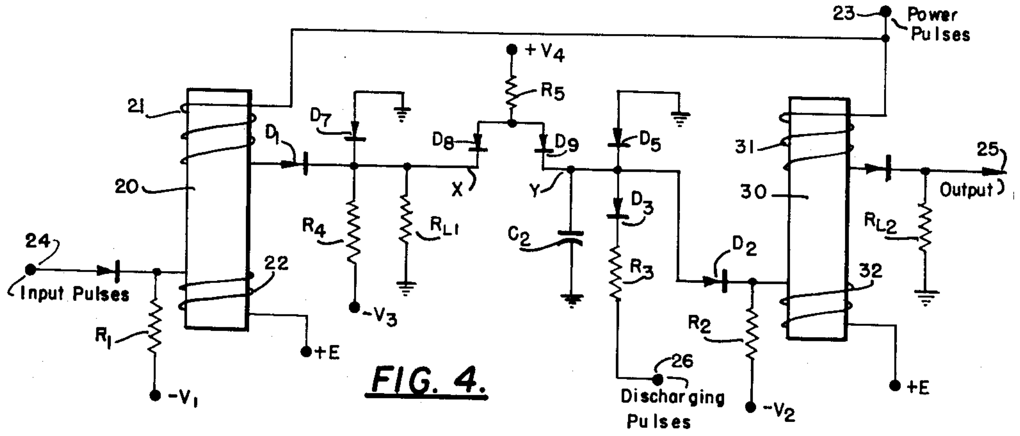
Figure 4 is a schematic diagram of still another form of the present invention comprising coupled magnetic amplifiers having a forcibly discharged capacitor intermediate storage.
Figure 5:
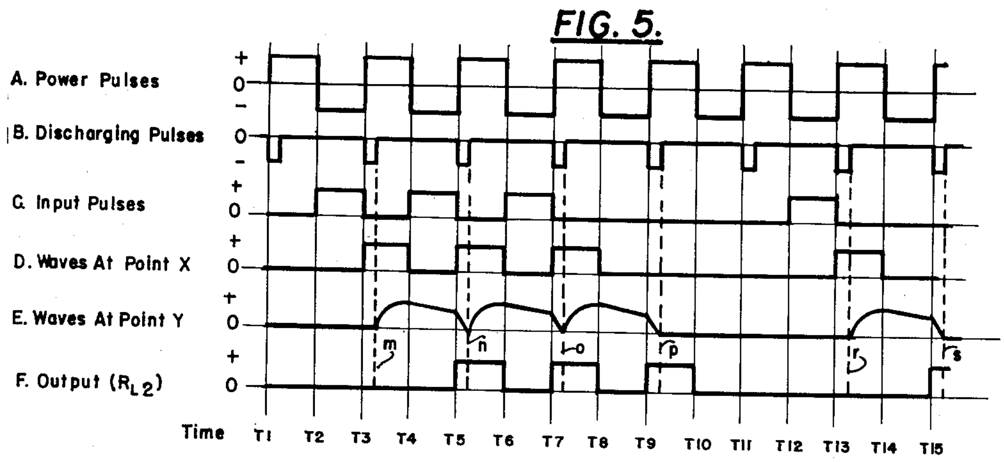
Figure 5 (A through F) are waveform diagrams illustrating the operation of the circuit shown in Figure 4.

As was mentioned previously, the discharging pulses, applied at the terminal 26 in Figure 4, occur at a time when the power pulses at terminal 23 are already driving the load. Thus, referring to Figure 5, it will be seen that, in the absence of an input pulse at terminal 24, no output is coupled via the rectifier D1 during the time interval $t1$ to $t2$. If now an input pulse should be coupled to the said terminal 24 during a time interval $t2$ to $t3$, an output pulse will appear at the point X during the time interval $t3$ to $t4$. For a time interval *m*, subsequent to time $t3$, a negative-going discharge pulse is applied at the terminal 26 which maintains the upper terminal Y of the storage capacitor C2 at substantially ground potential. Subsequent to time interval *m*, however, and inasmuch as the output pulse appearing at point X during the time interval $t3$ to $t4$ (Figure 5D) has disconnected the rectifier D8, a current will flow via the rectifier D9 charging the capacitor C2.

During the time interval $t4$ to $t5$, a further input pulse may be applied at the terminal 24, and during this same time interval the capacitor C2 discharges exponentially, passing an input via the rectifier D2 to the second amplifier stage employing core 30. The input pulse applied to terminal 24 during the said time interval $t4$ to $t5$ will again effect an output pulse at the point X during the time interval $t5$ to $t6$, but, for a time interval *n*, subsequent to time $t5$, a discharging pulse is again applied at the terminal 26 causing the point Y to be at substantially ground potential. During this time interval *n*, therefore, even though the load $R_{L1}$ is being driven from the output of the first amplifier stage, the capacitor C2 is forcibly discharged to remove all residual charge therefrom. During the remainder of the time interval $t5$ to $t6$, however, the capacitor C2 will once more be charged, as shown, whereby upon discharge, a further input pulse will be passed via the rectifier D2 to the second amplifier stage.

Still further waveforms operating in accordance with the foregoing discussion have been shown for the time intervals $t6$ to $t10$ and $t12$ to $t15$, and the discharge time intervals for this further operation have been designated as *o, p, r,* and *s*. Thus, the arrangement shown in Figure 4 once more comprises a coupled magnetic amplifier arrangement utilizing intermediate capacitive storage with means for forcibly discharging the said capacitor prior to storage of further information pulses therein.

Figure 6:
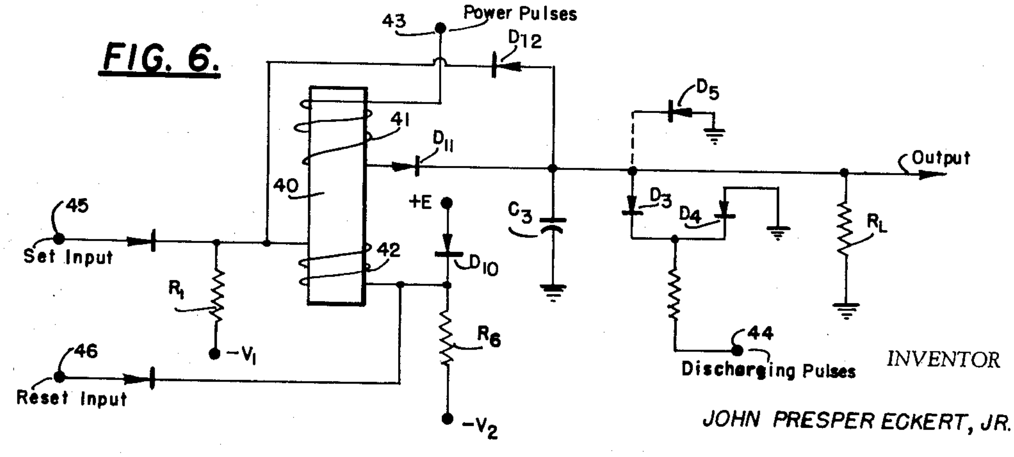
Figure 6 is a schematic diagram of a bistable device in the nature of a flip-flop utilizing a magnetic amplifier and a capacitive storage element in accordance with the present invention.

While the foregoing discussion has been concerned with coupled magnetic amplifiers, it will be noted that the concepts of the present invention may be employed to effect bistable devices in the nature of flip-flops and binary counters by feeding the discharge outputs of the capacitor employed back to the input of the amplifier stage, thereby to provide a locking feedback. One such circuit, acting in the nature of a flip-flop, has been shown in Figure 6, and the arrangement depicted therein may again comprise a core 40 of magnetic material carrying a power or output winding 41 and a signal or input winding 42 thereon. A source of power pulses of the type shown in Figure 2A may be coupled to the system at a terminal 43, and a source of discharge pulses of the type shown in Figure 2B may be coupled to a terminal 44. One end of the signal or input winding 42 is coupled to a clamp circuit comprising a rectifier D10 and a resistor R6, and the anode of the said rectifier D10 may be coupled to a source of positive potential +E, while one end of the resistor R6 is coupled to a source of negative potential $-V_2$, whereby the said one end of winding 42 is selectively clamped at a +E potential. The other end of the said winding 42 may be coupled to a set input terminal 45, and a reverting current source R1—$V_1$ is again coupled to the said other end of winding 42 to effect the non-complementing operation described previously.

A source of reset input pulses may also be coupled to a terminal 46 and thence to the clamp circuit D10—R6, thereby to selectively disconnect that clamp. The output of the system appears via a rectifier D11 across a storage capacitor C3, and discharge current from the said capacitor C3 may be passed via a further rectifier D12 to the signal or input winding 42 thereby to act as a locking feedback. The discharging pulse network again comprises the rectifiers D3 and D4, or in the alternative the rectifiers D3 and D5, and this discharging pulse source acts in the manner described previously.

In operation, and assuming that no set input appears at the terminal 45, the core 40 will be regularly driven about its hysteresis loop without effecting usable pulses via the rectifier D11. If now a set input pulse should be coupled to the said terminal 45 during a negative-going power pulse portion, this input will effectively oppose the reverting current flowing through the winding 42 and the resistor R1 to the source of negative potential $-V_1$, whereby the arrangement will pass an output pulse via the rectifier D11 charging the capacitor C3 during a next subsequent positive-going power pulse. Upon discharge, the capacitor C3 passes a feedback current via the rectifier D12 which acts as a further input to the amplifier and the amplifier will thereafter produce a still further output pulse. Thus, once a set input is applied at the terminal 45, the system will assume a first stable state characterized by successive pulse outputs appearing via the rectifier D11 and across the load $R_L$ during successive positive-going power pulses and, as was described previously, the capacitor C3 is forcibly discharged by discharging pulses (Figure 2B) applied at the terminal 44 subsequent to partial discharge of the said capacitor C3 and prior to the next output pulse appearing via rectifier D11.

If a reset input should appear at the terminal 46 during a negative-going power pulse portion at a time when the system is in a set-output stable state, this reset input will effectively oppose the discharge currents coupled to the said input via rectifier D12, whereby locking feedback is prevented from being coupled to the amplifier; core 40 is reverted to minus remanence, and the system reverts to a second stable state characterized by no-output pulses.

Figure 7:
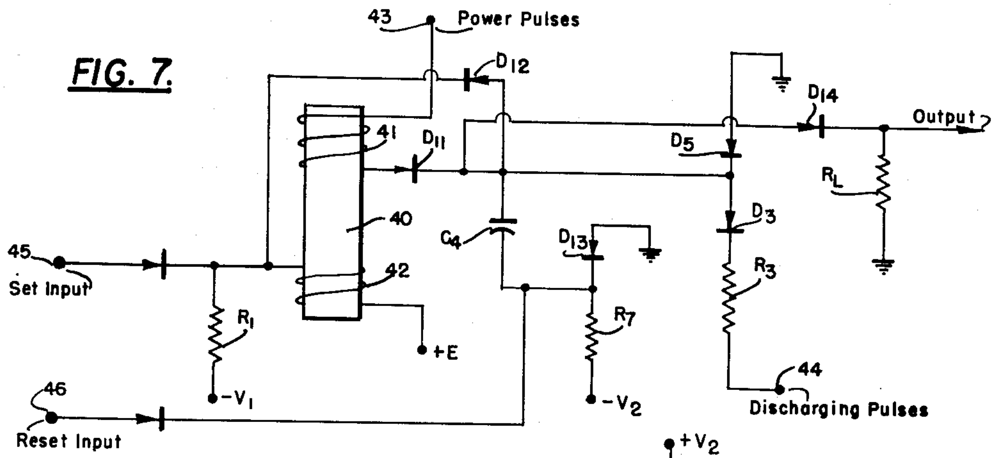
Figure 7 is a further schematic diagram of a bistable device in the nature of a flip-flop employing a forcibly discharged capacitive storage element.

A modified form of flip-flop operating substantially in accordance with the preceding discussion is shown in Figure 7, and again such a flip-flop may comprise a core 40 and the several components associated therewith. Again, the arrangement shown in Figure 7 utilizes power pulses coupled to the terminal 43 and discharging pulses coupled to the terminal 44, which pulses may assume the configuration shown in Figure 2. In accordance with the modification illustrated in Figure 7, however, the lower end of signal or input winding 42 is coupled to a source of positive potential +E rather than to the clamp circuit previously employed; and a further clamp circuit comprising a rectifier D13, having its anode connected to ground, and a resistance R7 having one end connected to a source of negative potential $-V_2$, is coupled to the lower terminal of the storage capacitor C4. The clamp circuit D13—R7 normally maintains the said lower terminal of capacitor C4 at ground potential, but the application of a reset input at the terminal 46, during a positive power pulse portion, raises this lower terminal potential above ground, and hence prevents any charge from accumulating therein. The discharging pulse circuit comprises the arrangement of rectifiers D3 and D5 and the resistor R3 and this circuit operates in substantially the manner discussed previously.

In addition, the output may be taken in parallel with the capacitor C4 charge and discharge circuit, in the manner discussed in reference to Figure 3, via a rectifier D14. In operation, and in the absence of a set input pulse, the core 40 will be regularly driven about its hysteresis loop without producing outputs via the rectifier D11. Upon application of a set input pulse at the said terminal 45, however, the capacitor C4 will be charged, and upon discharge will pass a locking feedback via the rectifier D12 to the input of the system, whereby the device once more assumes a first stable state characterized by output pulses successively appearing in coincidence with applied positive-going power pulse portions. As before, discharging pulses are applied at the terminal 44 during zeros of the power pulse, and each such discharging pulse causes the rectifier D5 to connect, whereby the upper terminal of capacitor C4 is brought to substantially the same potential as the lower terminal thereof, namely ground, causing forcible discharge of the capacitor C4 prior to application of a next subsequent output pulse via the rectifier D11. The application of a reset input during a positive-going power pulse portion will raise the lower terminal of the capacitor C4 to a potential substantially equal to that of the upper terminal thereof (assuming that the system was in its set output stable state), whereby the capacitor C4 is prevented from accumulating any charge thereon. Such a reset input pulse applied to terminal 46, therefore, causes the device to assume its second stable state characterized by a lack of output pulses.

Figure 8:
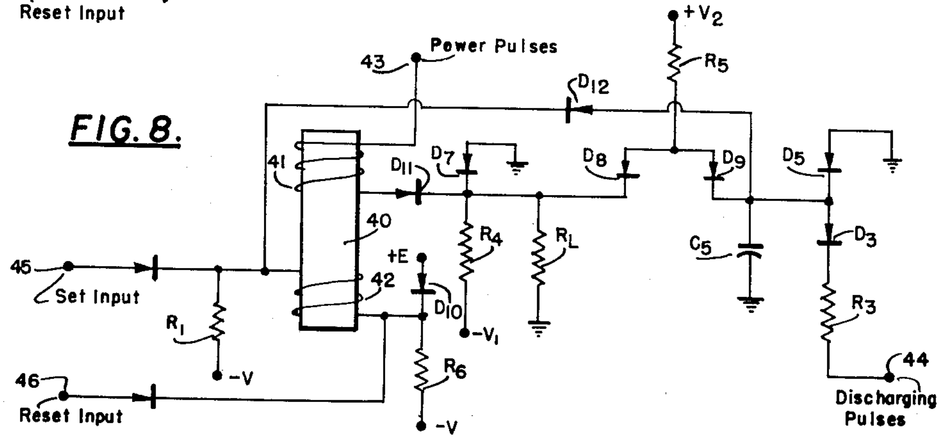
Figure 8 is a still further schematic diagram of a bistable device in the nature of a flip-flop utilizing a magnetic amplifier and a forcibly discharged capacitive storage element.

A still further bistable device in the nature of a flip-flop has been shown in Figure 8, and this further arrangement may utilize power pulses and discharging pulses of the type shown in Figures 5A and 5B, whereby forcible discharge of the capacitor store will be effected during times when the applied positive-going power pulse is already driving the load $R_L$. The arrangement thus illustrated in Figure 8 may again comprise a magnetic amplifier comprising a core 40 and the components associated therewith; and the lower end of signal or input winding 42 is coupled to a clamp circuit D10—R6, in the manner discussed in reference to Figure 6. A sneak suppressor comprising a rectifier D7 and resistor R4 has also been employed and the output of the device is coupled via a gating network comprising the elements D8 and D9 and the current source $V_2$—R5, in the manner discussed in reference to Figure 4. Output pulses passing via the gate D8—D9 are again impressed upon a storage capacitor C5 whereby, upon discharge, the said capacitor may pass locking feedback via the rectifier D12 to the input of the system. A source of discharging pulses comprising the rectifiers D3 and D5 and the resistance R3, is coupled to the upper terminal of the said capacitor C5, this discharging pulse source operating in the manner described in reference to Figures 3 and 4.

In operation, and assuming that the device of Figure 8 is initially in a non-output producing state, the application of a set input pulse at the terminal 45 will cause an output pulse to be passed via the rectifier D11, cutting off the rectifier D8 and permitting a charging current to flow from the source $+V_2$—R5 via the rectifier D9 to the capacitor C5. Upon discharge, the capacitor C5 again passes a locking feedback via the rectifier D12 to the input of the amplifier, whereby the device assumes a first stable state characterized by successive output pulses appearing in coincidence with applied positive-going power pulses at the terminal 43. A reset input pulse applied at terminal 46 once more opposes discharge current flowing via feedback rectifier D12 and effectively disconnects the said rectifier D12 whereby the device reverts to its second stable state characterized by a lack of output pulses. The application of negative-going discharge pulses at terminal 44 serves to forcibly discharge the capacitor C5 prior to the coupling of a next following output pulse, in the manner described in reference to Figures 5D and 5E.

Each of the foregoing embodiments of the present invention has assumed a discharge pulse configuration which is negative-going from a base level of zero. This particular consideration, however, is not mandatory and the circuits of the present invention may utilize other forms of applied pulses. Thus, referring to the arrangement of Figure 9 and the waveforms of Figure 10, a further bistable device in the nature of a flip-flop utilizing capacitive storage for providing locking feedback, has been shown; and this further arrangement utilizes pulses and operates in a manner quite different from those already discussed. The arrangement may comprise a core of magnetic material 50 having a power winding 51 thereon, coupled at one of its ends to a source of power pulses 52, of the configuration shown in Figure 10A. The other end of the said power winding 51 is coupled to the cathode of a rectifier D15 and the anode of the said rectifier D15 is coupled to the anode of a further rectifier D16 and to a source of positive potential $+V_2$ via the resistor R8, whereby the arrangement of the rectifiers D15 and D16 acts as a permissive gate.

A source of gating pulses 53, of the configuration shown in Figure 10B, is coupled to the cathode of the rectifier D16 and the output of the gate selectively appears at a point Y via a rectifier D17 thereby to charge selectively a storage capacitor C6. Discharging pulses, which may be negative-going from a positive base level (Figure 10C), may be coupled to a terminal 54 and to the storage capacitor C6 via a further rectifier D18. The core 50 also carries a signal or input winding 55 thereon, one end of which is selectively clamped at ground by a clamp circuit comprising rectifier D19, resistor R9 and the source of negative potential $-V_1$, and a reset input may be coupled to this same end of the signal or input winding 55 via a reset input terminal 56. Set inputs appearing at a terminal 57 may be coupled to the other end of the signal or input winding 55, as shown, and locking feedback occurring upon discharge of the capacitor C6, may be coupled via the rectifier D20 to the same end of the said signal or input winding 55.

Figure 9:
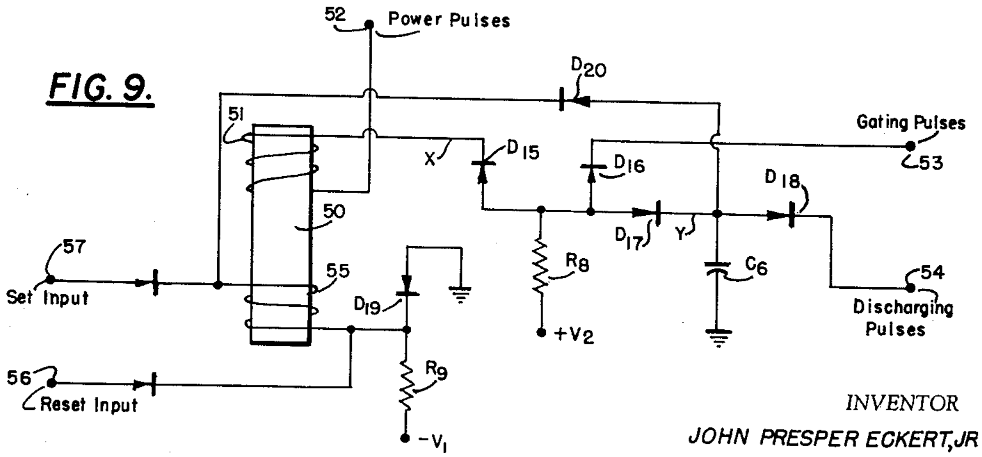
Figure 9 is a schematic diagram of a further bistable device in the nature of a flip-flop employing a forcibly discharged capacitive storage element.
Figure 10:
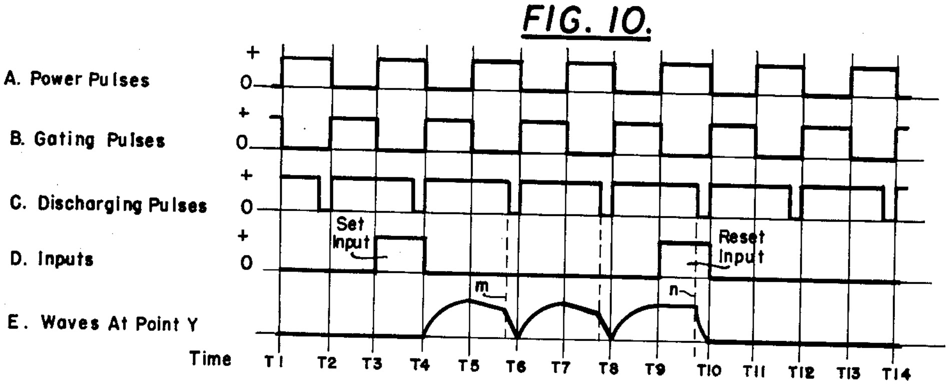
Figure 10 (A through E) are waveform diagrams illustrating the operation of the circuit shown in Figure 9.

Discussing now the operation of the arrangement shown in Figure 9, let us assume that the core 50 is initially at its plus remanence operating point. During a time interval *t1* to *t2*, the power pulse applied to terminal 52 is positive-going in nature thereby cutting off the rectifier D15. During this same time interval, the gating pulse applied to terminal 53 is substantially at ground level whereby current from the $+V_2$—R8 source passes through the rectifier D16 to ground and does not charge the capacitor C6. During the next subsequent time interval *t2* to *t3*, the power pulse source applied to the terminal 52 goes to ground, while the gating pulse applied to terminal 53 assumes a positive potential. Inasmuch as the core 50 is at its plus remanence operating point, current from the $+V_2$—R8 source now flows via the rectifier D15 and the winding 51 to the terminal 52, driving core 50 into saturation. For this state of operation, the winding 51 exhibits a low impedance whereby, once more, no current passes via the rectifier D17 to charge the capacitor C6. Thus, in the absence of a set input pulse, the core 50 is regularly driven from its plus remanence to its plus saturation points, without effecting a charge of the capacitor C6.

If now during a time interval *t3* to *t4* (Figure 10D), a set input pulse should be applied at the terminal 57, this input pulse will effect a current flow through the winding 55 to the ground clamp R9—D19 thereby flipping the core from its plus remanence to its minus remanence point during this time interval. During the next subsequent time interval *t4* to *t5*, current will once more flow from the $+V_2$—R8 source via the rectifier D15, flipping the core 50 from its minus remanence to its plus remanence operating points. Inasmuch as the winding 51 exhibits a relatively high impedance for this state of operation, however, and inasmuch as the gating pulse applied at terminal 53 during the time interval *t4* to *t5* acts to disconnect the rectifier D16, current will also flow via the rectifier D17, charging the capacitor C6 during this time interval *t4* to *t5*. During the next subsequent time interval *t5* to *t6*, the capacitor C6 will discharge, passing a feedback current through the rectifier D20 to the signal or input winding 55 again flipping the core 50 to its minus remanence operating point, thereby to condition the circuit for a further charge input to the capacitor C6. At a time interval *m* prior to the time *t6*, moreover, the discharge pulse source applied to the terminal 54 goes to ground, whereby rectifier D18 connects to forcibly discharge the capacitor C6. Thus, the application of a set input pulse at the terminal 57 causes the capacitor to be charged during successive time intervals and to be discharged during intermediate time intervals, and output pulses may be taken at appropriate points in the circuit.

If a reset input pulse should be coupled to the terminal 56 during a time interval *t9* to *t10*, this reset input will effectively disconnect the feedback rectifier D20 thereby preventing locking feedback from being fed to the winding 55. The circuit thus reverts to a second stable state characterized by a lack of output pulses, inasmuch as the application of a discharge pulse at the terminal 54, during a time interval *n*, prior to the time *t10*, causes forcible and complete discharge of the said capacitor C6. Thus, the device once more acts as a bistable device in the nature of a flip-flop, but in so acting employs waveforms considerably different from those described heretofore.

The principles discussed above may also be utilized to effect bistable devices in the nature of binary counters, and in this respect the several flip-flop circuits described previously may be modified by the provision of an input circuit responsive to one only of two possible inputs for passing an output therefrom. One such input circuit may take the form of a bridge rectifier and when this particular arrangement is employed, stepping pulses may be selectively coupled to one terminal of the bridge, thereby to cause the bistable device to assume an output producing state. These outputs may be selectively fed back to the bridge input circuit, thereby to provide a further input, in the nature of a locking feedback, maintaining the device in its said output producing state until the next subsquent step input pulse is applied to the bridge to prevent an output therefrom. By this arrangement therefore, the device will be caused to move successively between output producing and non-output producing states by the successive application of step inputs, whereby the device acts as a binary counter.

Figure 11:
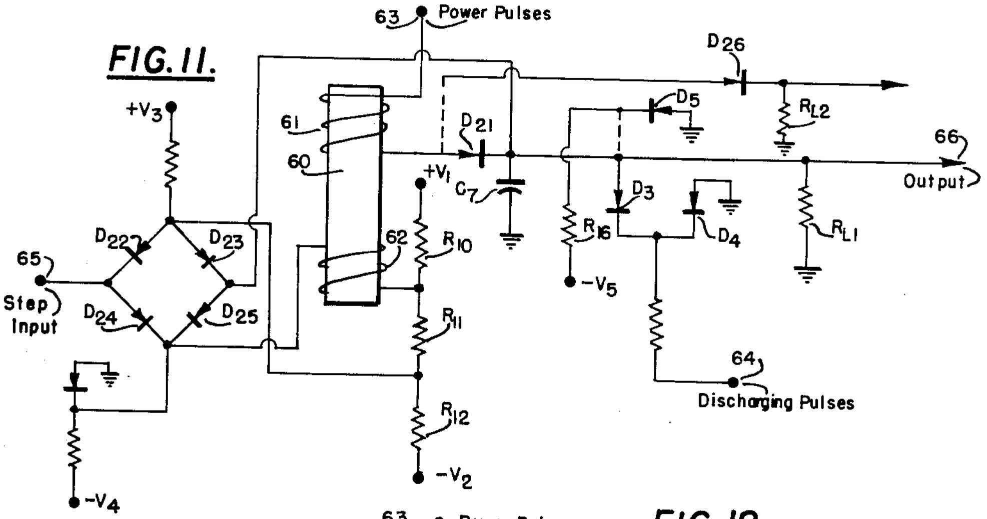
Figure 11 is a schematic diagram of a bistable device in the nature of a binary counter utilizing a magnetic amplifier and a forcibly discharged capacitive storage element.

Thus, referring to the circuit of Figure 11, one arrangement in accordance with the present invention, acting as a binary counter and adapted to utilize power pulses and discharging pulses of the type already discussed in reference to Figure 2, has been shown. The system operates substantially in accordance with the discussion given in respect to Figures 6 through 8, and comprises a core of magnetic material 60 having a power winding 61 and a signal or input winding 62 thereon. The power winding 61 is coupled at one of its ends to a source 63 of power pulses taking the configuration shown in Figure 2A, and the other end of the said power winding 61 is coupled via a rectifier D21 to a storage capacitor C7. Discharging pulses of the type shown in Figure 2B may be applied to a terminal 64 and cooperate with the discharging circuit comprising the rectifiers D3 and D4, or the rectifiers D3 and D5, in the manner described previously. In the event that the latter rectifiers are used, rectifier D5 may further cooperate with a resistor R16 to form a sneak suppressor circuit.

A voltage divider comprising resistors R10 through R12 inclusive is coupled between sources $+V_1$ and $-V_2$ to supply proper potentials for operation of the circuit, and one end of the signal or input winding is connected as shown to the junction of resistors R10 and R11. A bridge rectifier circuit, comprising rectifiers D22 through D25 inclusive, is utilized as an input circuit and a source of selectively applied step input pulses 65 may be coupled to the junction of the rectifiers D22 and D24. Similarly, locking feedback occurring upon partial discharge of the capacitor C7, is coupled as shown to the junction of rectifiers D23 and D25. The operation of such a bridge input circuit is well known, and the application of either a step input from the source 65, or a locking feedback from the capacitor C7 to the bridge, effects a pulse input to the signal winding 62, while the simultaneous application of step inputs and locking feedback to the input circuit prevents the passage of a pulse to the said input winding 62. Thus, if the device is assumed to be initially in a non-output producing state, a first step input pulse applied to the input circuit during a negative-going power pulse portion, will cause the device to effect an output pulse via the rectifier D21 during the next subsequent positive-going power pulse portion, which output pulse may be taken across the load $R_{L1}$, and which will charge the capacitor C7. During the next following negative-going power pulse portion, the capacitor C7 will partially discharge thereby supplying a further input to the winding 62 via the input rectifier bridge, and the capacitor C7 will then be forcibly discharged by the application of a discharging pulse at the terminal 64. This stable state is characterized therefore by successive output pulses appearing across the load $R_{L1}$, and at the output terminal 66, and will continue until the application of a next following step input pulse at the terminal 65 which serves to prevent the passage of locking feedback to the input winding 62.

As has been discussed previously, outputs may be taken across a further load $R_{L2}$ via a rectifier D26 connected in parallel with the charge and discharge circuits.

Figure 12:
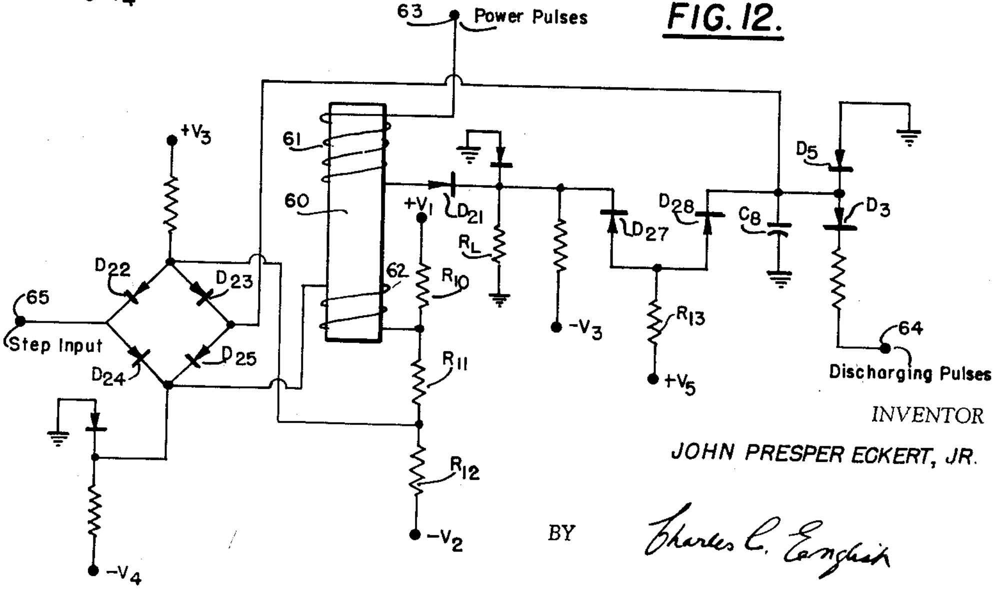
Figure 12 is a further schematic diagram of a bistable device in the nature of a binary counter employing a magnetic amplifier and a forcibly discharged capacitive storage element.

A still further arrangement, providing bistable action in the nature of a binary counter, and adapted to utilize power pulses and discharging pulses of the type discussed in reference to Figures 5A and 5B, has been shown in Figure 12. Again, the circuit may comprise a core 60 of magnetic material with its associated components; and once more a bridge circuit comprising the rectifiers D22 through D25 inclusive is supplied to couple either step input pulses or locking feedback pulses to the input winding 62. As was discussed, for instance in reference to Figures 4 and 8, a selective gating device comprising rectifiers D27 and D28 and a current source $V_5$—R13 may be employed to selectively pass charging currents to a storage capacitor C8. During discharge, the capacitor will pass locking feedback to the bridge rectifier input circuit and will thereafter be forcibly discharged by discharging pulses applied to the terminal 64 and cooperating with the discharge circuit comprising the rectifiers D3 and D5, which circuit operates in the manner already discussed.

Due to the provision of the bridge input circuit, the over-all counter operates in the manner described in reference to Figure 11, with the exception that the discharging pulses appearing at terminal 64 occur during portions of those time intervals when the output pulse appearing via rectifier D21 is already driving the load $R_L$. In other respects, however, the operation is as has been described previously.

While I have described preferred embodiments of the present invention, it must be stressed that the foregoing description is meant to be illustrative only and is not limitative of my invention. The principles of forcible capacitive discharge will find ready application in circuits other than those described above, and in addition, when magnetic amplifier devices are employed in the practice of the present invention, such amplifiers may take a variety of configurations other than those already discussed. Reference is made, for instance, to the copending application of Theodore H. Bonn and Robert D. Torrey, Serial No. 402,858, filed January 8, 1954, for: "Signal Translating Device"; and to the copending application of John Presper Eckert, Jr. and Theodore H. Bonn, Serial No. 382,180, filed September 24, 1953, for: "Signal Translating Device," now U.S. Patent No. 2,892,998, issued June 30, 1959. Each of the foregoing applications has been assigned to the assignee of the instant case, and each discloses other forms of magnetic amplifiers such as may be readily applied in the practice of the instant invention.

In addition, and as has been demonstrated by the foregoing discussion, the several pulse sources utilized may assume varying waveforms and varying time relations with respect to one another. Many further variations will accordingly suggest themselves to those skilled in the art, and all such variations as are in accord with the principles discussed above are meant to fall within the scope of the appended claims.

Having thus described my invention, I claim:

1. The combination comprising a gate circuit energized by regularly occurring spaced power pulses including positive-going, negative-going, and zero-dwell portions, a source of selective input signals coupled to said gate circuit for selectively effecting spaced output pulses therefrom, a capacitor coupled to the output of said gate circuit for storing charge in response to occurrence of said spaced output pulses, and discharge means coupled to said capacitor, said discharge means including a clamp circuit and a source of regularly occurring spaced discharge pulses coupled to said clamp circuit for regularly bringing both terminals of said capacitor to substantially the same potential, said spaced discharge pulses occurring respectively in coincidence with each of said zero-dwell potential portions.

2. The combination comprising a gate circuit energized by regularly occurring spaced power pulses including positive-going, negative-going, and zero-dwell portions, a source of selective input signals coupled to said gate circuit for selectively effecting spaced output pulses therefrom, a capacitor coupled to the output of said gate circuit for storing charge in response to occurrence of said spaced output pulses, a clamp circuit coupled to said capacitor, and a source of regularly occurring spaced discharge pulses occurring respectively in coincidence with each of said zero-dwell portions, said latter source being coupled to said clamp circuit.

3. A pulse control circuit comprising a magnetic amplifier energized by regularly occurring spaced power pulses including positive-going, negative-going, and zero-dwell portions, a source of selective input signals coupled to said amplifier for selectively effecting spaced output signals therefrom, a capacitor coupled to the output of said amplifier for storing charge in response to occurrence of said spaced output pulses, and discharge means coupled to said capacitor, said discharge means including a clamp circuit and a source of regularly occurring spaced discharge pulses coupled to said clamp circuit for regularly bringing both terminals of said capacitor to substantially the same potential, said spaced discharge pulses occurring respectively in coincidence with each of said zero-dwell potential portions.

References Cited in the file of this patent

UNITED STATES PATENTS

| | | |
|---|---|---|
| 2,208,655 | Wright | July 23, 1940 |
| 2,420,200 | Schoenfeld | May 6, 1947 |
| 2,713,674 | Schmitt | July 19, 1955 |
| 2,719,225 | Morris | Sept. 27, 1955 |
| 2,825,890 | Ridler et al. | Mar. 4, 1958 |
| 2,840,799 | Holt | June 24, 1958 |
| 2,922,985 | Crawford | Jan. 26, 1960 |

FOREIGN PATENTS

| | | |
|---|---|---|
| 1,086,494 | France | Aug. 11, 1954 |